Feb. 5, 1946.  E. WILDHABER  2,394,222
METHOD OF PRODUCING FACE CLUTCHES
Filed Oct. 17, 1942  2 Sheets-Sheet 1

Inventor
ERNEST WILDHABER
By B. Schlesinger
Attorney

Feb. 5, 1946. E. WILDHABER 2,394,222
METHOD OF PRODUCING FACE CLUTCHES
Filed Oct. 17, 1942 2 Sheets-Sheet 2
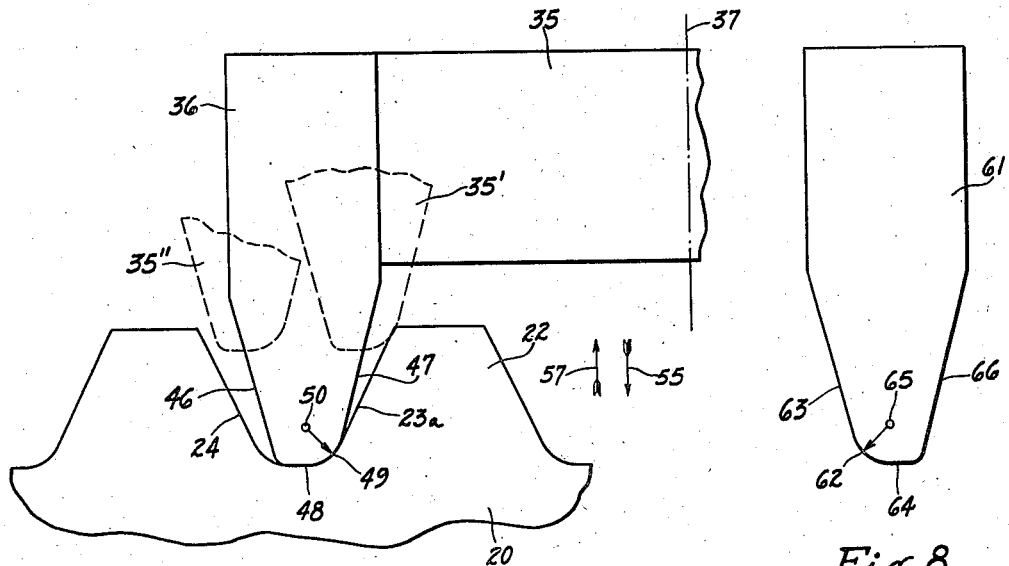
Fig. 7
Fig. 8
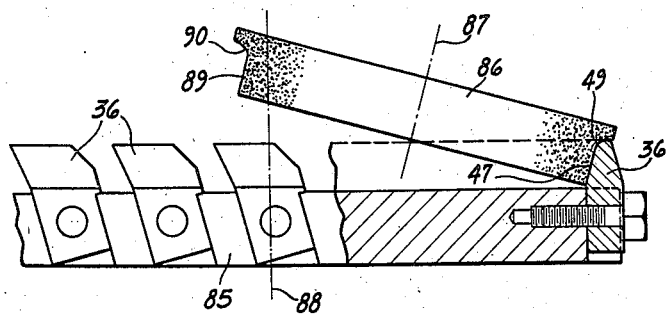
Fig. 9
Inventor
ERNEST WILDHABER
By [signature]
Attorney Patented Feb. 5, 1946

2,394,222

UNITED STATES PATENT OFFICE 2,394,222

METHOD OF PRODUCING FACE CLUTCHES

Ernest Wildhaber, Brighton, N. Y., assignor to Gleason Works, Rochester, N. Y., a corporation of New York Application October 17, 1942, Serial No. 462,389

9 Claims. (Cl. 90—9.4)

The present invention relates to toothed face clutches which have helical side tooth surfaces and to methods of producing such clutches. This type of clutch is used where it is desired that a clutch disengage automatically under excessive loads, and in various other applications where it is desirable that the clutch members be capable of transmitting loads not only when fully engaged but also in positions of partial engagement. The present application covers the novel method of the present invention. The new clutch is covered in a separate application, Serial No. 582,348, filed March 12, 1945, as a division of the present application.

One object of the invention is to provide a very fast method for cutting toothed face clutch members of the character described. To this end it is a purpose of the invention to provide a method which may be used either in cutting or chamfering of the helical sides of the teeth of a clutch member and which will permit cutting or chamfering two helical side surfaces of a toothed face clutch member in a single cutting cycle.

A further object of the invention is to provide a method for producing toothed face clutch members of the character described by which opposite sides of spaced teeth of a clutch member may be finished in a single cutting cycle with a face-mill cutter.

Another object of the invention is to provide a method for producing helical-sided toothed face clutch members which will have teeth of uniform depth from end to end.

A further object of the invention is to provide a toothed face clutch in which the contacting tooth surfaces of the two members will engage with less than full length tooth contact so that undue concentration of loads at the ends of the teeth may be avoided both when the clutch members are in engagement and when they are moving into or out of engagement.

A still further object of the invention is to provide a toothed face clutch member having helical tooth sides which will have proper engagement not only in full depth position but also in positions of partial engagement, such as a position of half depth.

Other objects of the invention will be apparent hereinafter from the specification and from the recital of the appended claims.

In cutting the tooth surfaces of a toothed face clutch member according to the present invention, a face mill cutter of large diameter is employed and is so positioned that it will operate simultaneously in two spaced tooth zones of the work. The cutter is rotated on its axis in engagement with the work while a relative depthwise feed movement is effected between the cutter and work and while simultaneously the work is rotated on its axis. The work rotation and the feed movement are effected in time with one another, and preferably both are effected at a uniform rate. One side of a tooth is cut during in-feed of the cutter into the work and the opposite side of a tooth spaced from the first tooth is cut during the out-feed motion. The work rotates continuously in the same direction during both in and out feed movements. After a tooth space has been cut and the cutter is clear of the work, the work is indexed.

Preferably, the cutter is positioned so that its axis is parallel to the axis of the work. In this way, tooth spaces and teeth of constant depth from end to end may be cut. Preferably, also, the feed motion will be in a direction parallel to both the work and cutter axes.

In the drawings:

Fig. 7 is a diagrammatic view on an enlarged scale, further illustrating the method of cutting one of the clutch members according to this invention;

Fig. 8 is an enlarged view of one of the blades of a cutter such as may be employed in the cutting of the mating clutch member; and Fig. 9 is a diagrammatic view showing how the blades of a cutter, which is to be used in the process of the present invention, may be relieved by a very simple relieving process.

Figure 1:
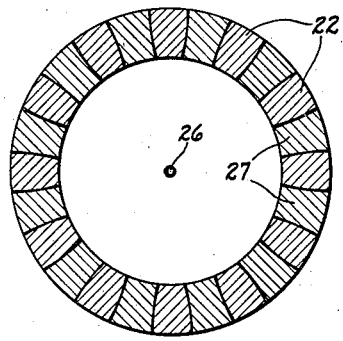
Fig. 1 is a sectional view through a pair of engaged toothed face clutch members made according to one embodiment of this invention, the section being taken in a mean plane, hereinafter referred to as the pitch plane, which is perpendicular to the clutch axis.
Figure 2:
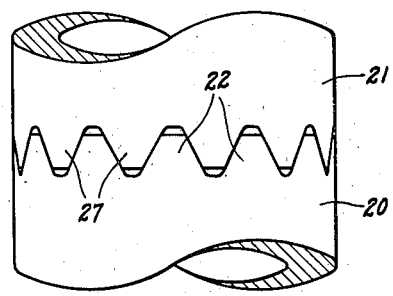
Fig. 2 is a fragmentary elevational view of the engaging clutch members.

In the drawings, 20 and 21 (Fig. 2) denote, respectively, the two members of a clutch constructed according to one embodiment of this invention. The member 20 has teeth 22 whose opposite sides 23 and 24 are longitudinally convex, and which, at mean points, such as the points 25 and 25' along the length of the teeth, are truly radial of the clutch axis 26. The member 21 has teeth 27 whose opposite sides 28 and 29 are longitudinally concave and at mean points in the teeth length are also radial of the clutch axis.

Figure 4:
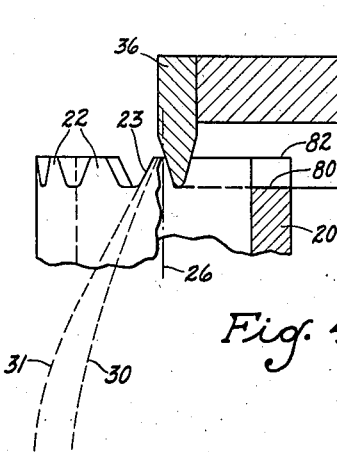
Fig. 4 is a part elevational, part sectional view taken at right angles to Fig. 3, and further illustrating diagrammatically the method of cutting this clutch member.

The sides of the teeth of both members are helical surfaces and can be considered as composed of helices concentric with the clutch axis 26. Two of the helices, which compose one side surface 23 of the clutch member 20, are indicated in dotted lines at 30 and 31, respectively, in Fig. 4. The helix 30 is at the inner end of the tooth side 23 and the helix 31 at the outer end thereof.

For cutting the side tooth surfaces of the clutch member 20, a face mill cutter 35 (Fig. 4) is employed that has a plurality of cutting blades 36 whose cutting portions project beyond one side face of the cutter in the general direction of the axis 37 of the cutter and are arranged circularly about said axis. The cutter is preferably positioned so that its axis 37 is parallel to the axis 26 of the clutch member. The cutter is also preferably so positioned that a tangent 38 (Fig. 3) to its periphery at means point 44 of the clutch teeth will pass through the clutch axis 26. The axis 37 of the cutter intersects, therefore, a line 39 normal to the clutch radius 38.

Figure 3:
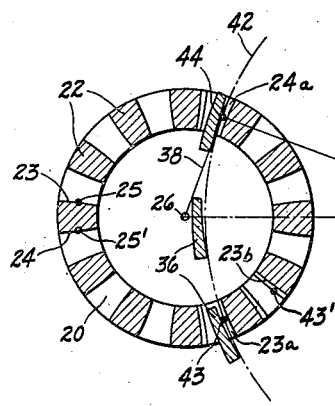
Fig. 3 is a diagrammatic view, showing one clutch member in section in the pitch plane, but illustrating, also, the relationship in the root plane between the cutter and the work during the cutting of this clutch member.

Fig. 3 illustrates the limit case where the cutter axis 37 also lies in the plane of symmetry containing the clutch axis 26. Circle 42 drawn about the cutter axis 37 through a mean point 44 in the root line of a side 24a of one tooth of the clutch member will then also pass through mean point 43 in the root line of the side 23a of a tooth of the clutch member which is spaced from the first named tooth.

The blades 36 of the cutter 35 have preferably straight sides 46 and 47 (Fig. 7) of positive pressure angle or inclination to the cutter axis 37 and rounded finish cutting edges 49 formed at the junctures of the inside edges 47 of the blades with the tip surfaces 48 of the blades. The rounded finish cutting edges 49 are preferably made circular arcuate in shape. Thus the center of the rounded portion 49 of the blade shown in Fig. 7 is at 50.

In cutting the clutch member 20, the cutter 35 is rotated on its axis 37 while a relative depthwise feed motion is effected between the cutter and work, preferably at a uniform rate, and preferably in the direction of the clutch axis 26. At the same time, the work 20 is rotated preferably at a uniform rate on its axis 26. At or near full-depth position, the feed motion is reversed while the rotary motion of the work continues in the same direction as during in-feed. During the out-feed motion a side of a tooth, spaced from the first tooth and opposite to the tooth side cut during in-feed, is finished. The out-feed is at the same rate as the in-feed and is also preferably uniform.

An initial position of the cutter at the beginning of the in-feed motion is shown in dotted lines at 35' in Fig. 7. As the work is turned in the direction 56 and the relative in-feed progresses in say direction 55, the rounded portions 49 of the cutter blades generate the helical tooth side 23a. The side edges 46 and 47 serve simply to help remove stock but the finished shape of the side 23a is produced solely by the rounded edges 49 of the blades. The generation of the tooth side 23a is completed when the cutter has attained the full line position shown in Fig. 7. Thereafter reversal of the feed motion takes place. In the out-feed motion, the sides 46 of the cutter blades clear the final shape of the tooth surface 24 adjacent the tooth surface 23a which has been cut on the in-feed. During the out-feed, however, the finishing action has shifted and the rounded portions 49 of the cutter blades finish-cut in the other tooth zone in which the cutter operates, with the result that the tooth side 24a (Fig. 3) opposite to and spaced from the tooth side 23a is finished during the out-feed motion. 35'' (Fig. 7) denotes the position that the cutter reaches near the completion of the out-feed motion. When the cutter is clear of the blank, the blank is then indexed, and the cycle starts anew. It will thus be seen that opposite sides of two spaced teeth of the work, as, for instance, the sides 23a and 24a of the clutch are finished in a single cutting cycle, one side being finished during the in-feed, and the other side during the out-feed.

Where, as shown in Fig. 3 the axis 37 of the cutter lies in the plane of symmetry 40, a very fast reversal of the depthwise feed motion is required at the end of the in-feed. Practically no time can elapse between the end of the in-feed motion and the start of the out-feed motion. A slower, smoother operating reversal can be obtained by slightly decreasing the point width of the cutter and using a cutter of larger radius, centered further out on the line 39, as, for instance, at 37'. A circle centered at 37' and containing the point 44 will then pass to the left of the point 43 with the result that more time may elapse between the generation of the opposite sides of the spaced teeth of the work, and therefore more time may be taken for reversal of the feed motion.

Figure 6:
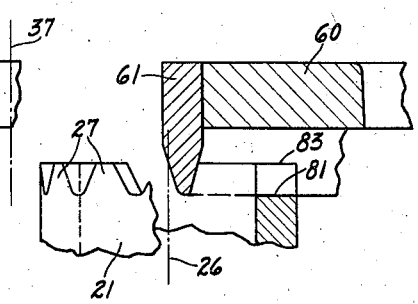

In cutting the tooth surfaces of the clutch member 21, which is to engage with the clutch member 20, a face mill cutter 60 (Fig. 6) is employed having cutting blades 61 arranged circularly about its axis. These blades 61 have rounded finish-cutting edges 62 formed at the junctures of their outside edges 63 and their tip edges 64, as shown in Fig. 8. The rounded portion 62 of each blade is preferably a circular arc and centered at 65. The side edges 63 and 66 of the blades are preferably made straight.

Figure 5:
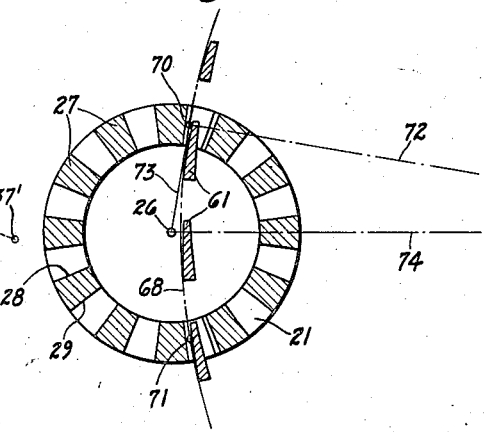
Figs. 5 and 6 are views, corresponding to Figs. 3 and 4, respectively, and illustrating diagrammatically one method of cutting the engaging clutch member.

In Fig. 5, the cutter 60 is shown in a limit position where its cutting circle 68 passes simultaneously through mean points 70 and 71 in the root lines of the helical tooth sides. The cutter center lies on a line 72 drawn at right angles to the clutch radius 73 and in the limit case the cutter axis also lies in the plane of symmetry 74 containing the clutch axis 26. As before, such a position requires quick reversal of the in-feed motion after one helical side tooth surface of the clutch member has been cut to full depth. By using a slightly smaller diameter than that shown, a longer time can be taken for reversal of the depth feed.

Except for the cutter and its radial setting, the process of generating the helical side tooth surfaces of the member 21 is the same as for generating the helical side tooth surfaces of the clutch member 20. The cutter is rotated in engagement with the work while a relative depthwise feed movement is effected between the cutter and the work preferably at a uniform rate and while simultaneously the work is rotated on its axis in time with the feed motion and preferably at a uniform rate. One helical side tooth surface of the work is generated during the in-feed and the opposite side of a spaced tooth of the work is generated during the out-feed.

The cutters employed for cutting the clutch members 20 and 21 may be provided with alternate blades having, respectively, opposite side rake to obtain keen inside and outside cutting edges, respectively. The cutters may also be provided with blades, each of which has both an outside and an inside cutting edge. In this case, keen cutting action may be obtained by sharpening each of the blades with a front hook so that its front face inclines rearwardly from its tip to its base.

As already pointed out, the finish-cutting of the helical side surfaces of the clutch member 20 is done wholly with rounded portions 49 at the insides of the blades of the cutter 35, while the finish-cutting of the helical side surfaces of the clutch member 21 is done wholly with rounded portions 62 at the outside of the blades of the cutter 60. The diameters of the two cutters 35 and 60 are different. The cutter 60 which finishes with the outside rounded portions of its blades being of the larger diameter. Because of this difference in the diameter of the two cutters, the lengthwise curvature of the contacting tooth surfaces of the two clutch members will differ. Hence, the contacting tooth surfaces of the two clutch members will engage with a localized tooth bearing which will extend for less than the full length of the teeth, easing off at the ends of the teeth. This condition is desirable as it prevents undue concentration of the tooth loads at the ends of the teeth. Additional easing off or mismatch can be obtained by using a cutter of smaller diameter to cut the clutch member 20, as, for instance, a cutter whose finishing circle would pass simultaneously through mean points 44 and 43' in the root lines of opposite sides 24a and 23b of spaced teeth of the work. The point 43' is a mean point in the root line of the tooth side 23b spaced one pitch closer to a tooth side 24a than the tooth side 23a. Additional mismatch can be obtained by cutting both members of the pair with cutters having inside finish cutting portions, that is, by cutting both members like the clutch member 20.

The root lines 80 and 81 of the teeth of clutch members cut in the manner described, that is, the tooth bottoms, lie in a plane perpendicular to the clutch axis 26. It is also preferred to have the top surfaces 82 and 83 of the clutch members lie in planes perpendicular to the clutch axis 26. Thus, the teeth of the clutch members may be of constant depth from end to end.

As stated, the straight side edges 46, 47, 63, and 66 of the cutters do no finish-cutting, finishing of the tooth sides being done only with the rounded portions 49 and 62 of the blades. Hence, the only portions of the blades which require to be made to high accuracy are the rounded portions of the blade. These are the only portions of the blades which are required to retain their shapes after sharpening.

I have found that the rounded portions of the blades can be ground accurately in such way as to maintain their shape uniform, despite sharpening, by mounting the blades in dummy heads and grinding the portions 49 or 62 of the blades as surfaces of revolution concentric with the axes of the dummy heads. Thus, the blades 36 can be relief-ground by mounting these blades in a dummy head 85 in such way that the blades are tilted forward from cutting position by an angle equal to the angle of the top relief of the blades. A grinding wheel 86, whose axis is at 87 inclined to the axis 88 of the dummy head at an angle equal to the pressure angle of the inside edges 47 of the blades, and whose peripheral surface is dressed to a suitable profile shape may then be used for grinding simultaneously the inside surfaces and the rounded portions of the blades. The wheel 86 is of straight profile 89 for the greater portion of its height and is rounded as indicated at 90 near its base to grind a proper round 49 on the blades. Relief grinding of the blades is effected simply by rotating the wheel and head on their respective axes 87 and 88. Thus the rounded portions 49 and sides 47 of the blades are ground as surfaces of revolution concentric with the axis 88 of the dummy head. The outside surfaces of the blades 36 may be ground in this same dummy head 85 by using a cylindrical grinding wheel of straight profile whose axis is inclined to the axis 88 of the dummy head at the pressure angle of the outside edges of the blades. The blades 61 of cutter 60 may be relief ground in similar manner.

A relief-grinding process like that described was formerly used for relief-grinding the blades of face mill gear-roughing cutters. It was never accurate enough for grinding the blades of gear finishing cutters, and it has even been discontinued for the grinding of the blades of roughing cutters. This is because the side surfaces of blades relief-ground by this method change in pressure angle from front to rear with the result that the pressure angles of the side edges of the blades change when the blades are sharpened, and this change is greater than present day tolerances permit even for gear-roughing cutters.

In cutters employed for cutting toothed face clutch members according to the present invention, however, the finishing is done exclusively by the rounded portions at the tips of the blades and the accuracy of the clutch members is in nowise dependent upon the accuracy of the grinding of the side edges of the blades. Hence, a considerable variation in pressure angle from front to rear of the side edges of the blades may exist without it in any way affecting the accuracy of the clutch members produced by the method of the present invention. Because of this, therefore, it is possible to relief-grind the cutter blades by the above described relief-grinding process and produce cutters for cutting clutch members according to the present invention very simply and at relatively low cost.

While the invention has been described in connection with the cutting of toothed face clutches with face mill cutters, it will be understood that it is applicable also to the grinding of helical-sided toothed face clutches with annular grinding wheels and that where the term cutter is used in the specification and claims, it is intended to cover both face-mill cutters and annular grinding wheels. In either case the depthwise feed motion may be imparted either to the cutter or to the work. When the feed is imparted to the work, the work has a helical motion during cutting, which is about and in the direction of its axis.

In the embodiment of the invention illustrated in the drawings, the helical side surfaces of the teeth occupy the whole working depth of the teeth. The method of the present invention may be used, however, for providing a chamfer on the sides of clutch teeth and in this case, only the part of the working depth of the teeth adjacent the tops of the teeth will be cut as helical surfaces.

In general, it may be said that while the invention has been described in connection with a particular embodiment thereof, it will be understood that it is capable of still further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of producing tooth surface of a toothed face clutch member which comprises positioning a face-mill cutter in engagement with a work-piece so that the axis of the cutter is parallel to the axis of the work, and rotating the cutter in engagement with the work while effecting a relative helical movement between the cutter and work about and in the direction of the work axis until the tooth surface is cut for its full height.

2. The method of producing tooth surfaces of a toothed face clutch member which comprises rotating a face mill cutter in engagement with a work-piece, while turning the work-piece on its axis, and effecting a relative depthwise feed movement between the cutter and work-piece first in one direction and then in the other in time with the work rotation, to cut one side surface of a tooth during feed in one direction and the opposite side surface of a tooth spaced from the first during feed in the opposite direction.

3. The method of producing a tooth surface of a toothed face clutch member which comprises positioning a face-mill cutter in engagement with a work-piece so that the axis of the cutter is parallel to the axis of the work-piece, and rotating the cutter on its axis while rotating the work-piece on its axis at a uniform rate and effecting a relative depthwise feed motion between the cutter and work-piece in time with the work rotation in the direction of the clutch axis and at a uniform rate until the tooth surface is cut for its full height.

4. The method of cutting side tooth surfaces of a toothed face clutch member which comprises employing a face-mill cutter that has cutting blades, each of which has a cutting portion that has a round formed at the juncture of the top and one side of the blade, positioning said cutter in engagement with a work-piece so that it operates simultaneously in two spaced tooth zones of the work-piece, and rotating the cutter in engagement with the work-piece while effecting a relative feed motion between the cutter and work-piece first in one direction and then in the other, while simultaneously rotating the work-piece on its axis continuously in one direction in time with the feed motion, and indexing the work-piece after each cycle when the cutter is clear of the work-piece.

5. The method of cutting side tooth surfaces of a toothed face clutch member which comprises positioning a face-mill cutter so that its axis is parallel to the axis of the work-piece, and rotating the cutter on its axis while rotating the work-piece on its axis and effecting a relative feed motion between the cutter and work-piece in the direction of the axis of the work-piece in time with the rotation of the work-piece, first in one direction and then in the other to cut a side surface of one tooth of the clutch member during the in-feed and the opposite side surface of a spaced tooth of the clutch member during out-feed.

6. The method of cutting side tooth surfaces of a toothed face clutch member which comprises positioning a face-mill cutter so that its axis is parallel to the axis of the work-piece and rotating the cutter on its axis while rotating the work-piece on its axis at a uniform rate and effecting a relative feed motion between the cutter and work-piece in the direction of the axis of the work-piece at a uniform rate in time with the rotation of the work-piece, first in one direction and then in the other, to cut a side surface of one tooth of the clutch member during in-feed and the opposite side surface of a spaced tooth of the clutch member during the out-feed, the out-feed being at the same rate as the in-feed.

7. The method of cutting a pair of engaging toothed face clutch members which comprises cutting each member by positioning a face mill cutter, that has rounded cutting edges formed at the juncture of one side and the tips of its blades, with the axis of the cutter parallel to the axis of the clutch member, and cutting one side surface of each tooth of each member by rotating the cutter in engagement with a work-piece while rotating the work-piece on its axis and effecting a relative depthwise in-feed motion between the cutter and work-piece in the direction of the axis of the work-piece in time with the rotation of the work-piece, and then cutting the opposite side of a spaced tooth of each clutch member by continuing to rotate the cutter and work-piece in the same direction while effecting a relative out-feed motion between the cutter and work-piece in the direction of the axis of the work-piece and in time with the cutter rotation, and indexing the work-piece when the cutter is clear of the work-piece, the cutter used for cutting one member of the clutch pair having its rounded cutting edges formed at the juncture of the outside edges and tips of its blades and the cutter used for cutting the other clutch member having its rounded cutting edges formed at the juncture of the inside edges and tips of its blades, the diameter of the first named cutter being greater than the diameter of the second named cutter.

8. The method of producing a toothed face clutch member which comprises positioning a cutting tool in engagement with a work-piece so that on actuation the tool will operate in two spaced tooth zones of the work, and imparting cutting movement to the tool while rotating the work on its axis and while effecting a relative feed movement between the tool and the work in the direction of the work axis and in time with the work rotation until full depth position is reached, then reversing the direction of the feed motion while continuing to rotate the work in the same direction as before, and indexing the work after the tool has been withdrawn clear of the work.

9. The method of cutting side tooth surfaces of a toothed face clutch member which comprises positioning a cutting tool in engagement with a work-piece so that on actuation the tool will operate in two spaced tooth zones of the work simultaneously, and imparting a cutting movement to the tool while rotating the work on its axis at a uniform rate and effecting a relative feed motion between the tool and the work axially of the work at a uniform rate in time with the work rotation first in one direction and then in the other to cut one side surface of one tooth of the clutch member during the in-feed and the opposite side surface of a spaced tooth of the clutch member during the out-feed, and indexing the work when the tool is clear of the work at the end of the out-feed movement.

ERNEST WILDHABER.